United States Patent [19]

Ueno et al.

[11] 4,056,086

[45] Nov. 1, 1977

[54] METHOD OF ACCELERATING EVAPORATION OF FUEL IN INTERNAL COMBUSTION ENGINE INTAKE SYSTEM BY HEAT EVOLVED BY DECOMPOSITION OF $H_2O_2$ AND APPARATUS FOR SAME

[75] Inventors: Zene Ueno, Fuchu; Katuaki Kosaka, Hidaka; Fumio Wagatsuma, Tokyo, all of Japan

[73] Assignee: Nissan Motor Company, Limited, Yokohama, Japan

[21] Appl. No.: 606,214

[22] Filed: Aug. 20, 1975

[30] Foreign Application Priority Data

Aug. 21, 1974  Japan .................................. 49-95816

[51] Int. Cl.² ............................................. F02M 31/00
[52] U.S. Cl. ............................. 123/122 R; 123/122 D; 123/122 E; 261/144

[58] Field of Search ........................... 261/144, 18 A; 123/122 E, 1 A, 133, 3, 34 A, 25 B, 25 A, 122 R, 119 E

[56] References Cited

U.S. PATENT DOCUMENTS

| | | | |
|---|---|---|---|
| 1,461,470 | 7/1923 | Ackley | 123/122 E |
| 1,791,949 | 2/1931 | Boulade | 123/122 F |
| 2,775,961 | 1/1957 | Petre | 123/119 E |
| 2,862,482 | 12/1958 | Hart | 123/119 E |

*Primary Examiner*—Ronald H. Lazarus

[57] ABSTRACT

$H_2O_2$ or its aqueous solution is catalytically decomposed into oxygen and water in a vessel having radiation fins formed on its wall, and the heat of decomposition is transferred to air drawn into the induction passage, to fuel ready to jet into the drawn air or to an air-fuel mixture flowing through the induction passage. The evolved oxygen is fed to the combustion chamber and/or the exhaust line of the engine.

23 Claims, 6 Drawing Figures

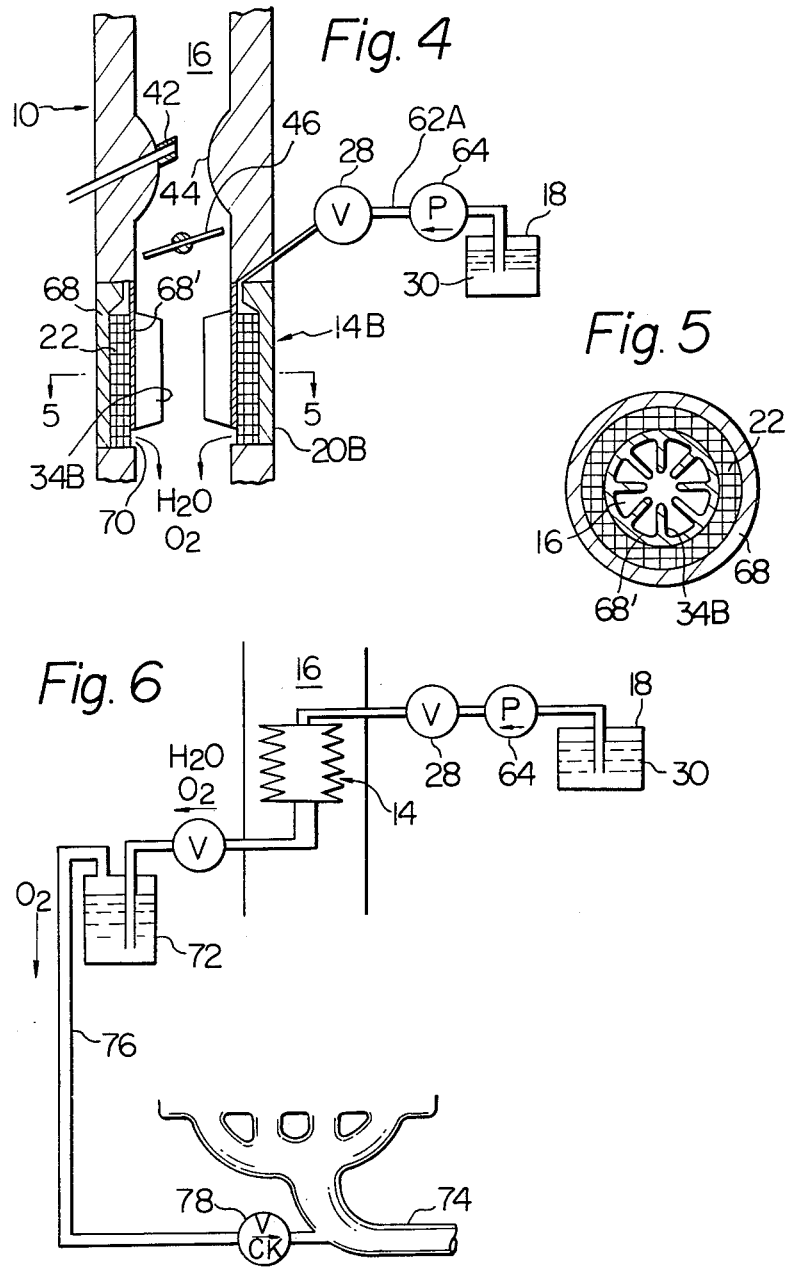

METHOD OF ACCELERATING EVAPORATION OF FUEL IN INTERNAL COMBUSTION ENGINE INTAKE SYSTEM BY HEAT EVOLVED BY DECOMPOSITION OF $H_2O_2$ AND APPARATUS FOR SAME

This invention relates to an intake system of an internal combustion engine, and more particularly to a method and apparatus for accelerating the evaporation of fuel in the intake system especially in the case of a cold start of the engine.

With respect to internal combustion engines, particularly gasoline engines, it is a usual practice to feed temporarily a considerably enrich air-fuel mixture to the engine by means of a choke valve when the engine is started in the cold. The fuel-enriched mixture is needed for the reasons that the combustion of the mixture in the engine occurs at relatively low efficiencies during a cold start due to incomplete evaporation of fuel and that a comparatively large output torque is required to keep the cold engine running due to high viscosity of cold lubricating oil.

The combustion of such a rich air-fuel mixture remains incomplete due to shortage of oxygen and low combustion temperature. Accordingly, the exhaust gas contains therein significantly large amounts of carbon monoxide and unburned hydrocarbons contrary to current requirements for reducing them in connection with prevention of air pollution. From a different point of view, the use of such a rich mixture leads naturally to an increase in the fuel consumption.

It is an object of the present invention to provide a method of accelerating or facilitating the evaporation of fuel within an intake system of an internal combustion engine thereby to cause complete burning of the fuel in the engine, which method does not rely on a fuel-enriched combustible mixture and is characterized by the use of heat of decomposition of hydrogen peroxide as the heat source.

It is another object of the invention to provide an intake system of an internal combustion engine, which system comprises apparatus for catalytically decomposing hydrogen peroxide into oxygen and water in such an arrangement that the heat of decomposition is transferred to air, fuel or their mixture flowing in the intake system thereby to facilitate the evaporation of the fuel.

According to a method of the invention, hydrogen peroxide, which is preferably in the form of an aqueous solution, is catalytically decomposed into oxygen and water, and the heat of decomposition is transferred to air drawn into an induction passage of an intake system of an internal combustion engine, or fuel entering a nozzle for feeding the fuel to the induction passage, or an air-fuel mixture flowing through the induction passage. The evolved oxygen is fed to the combustion chamber and/or the exhaust system of the engine.

An intake system according to the invention comprises an induction passage for drawing air therein and conducting the drawn air to the inlet port of the combustion chamber of the engine, means for feeding an evaporable fuel to the drawn air, and apparatus for decomposing hydrogen peroxide, which is preferably in the form of an aqueous solution. The decomposition apparatus comprises a hydrogen peroxide tank, a reaction vessel containing therein a catalyst for contact decomposition of hydrogen peroxide, a discharge nozzle arranged to feed hydrogen peroxide from the tank to the reaction vessel and means for controlling fluid flow between the hydrogen peroxide tank and the nozzle. The wall of the reaction vessel is shaped to have a large outer surface area for efficient heat radiation, and the vessel is positioned either in the induction passage or in a fuel duct at a location close to an end thereof i.e., a fuel discharge nozzle opening into the induction passage.

Other features and advantages of the invention will become apparent from the following detailed description of preferred embodiments thereof with reference to the accompanying drawings, in which:

FIG. 4 is a sketch of a longitudinal section of a still different intake system as a still another embodiment of the invention;

FIG. 5 is a cross-section taken along the line 5—5 of FIG. 4; and

FIG. 6 is a block diagram of an internal combustion engine having an intake system according to the invention, wherein excess oxygen is supplied from the intake system to the exhaust system as a subsidiary feature of the invention.

As is known, hydrogen peroxide is miscible with water in all proportions. Either pure hydrogen peroxide or an aqueous solution of hydrogen peroxide is decomposed into water and oxygen with the evolution of a large quantity of decomposition heat upon contact with a catalyst such as, e.g., silver or a copper-chromium system. The decomposition of hydrogen peroxide is represented by the following equation:

$$2H_2O_2 \rightarrow 2H_2O + O_2 + Q(Kcal)$$

The quantity of the heat of decomposition and the adiabatic decomposition temperature depend on the hydrogen peroxide concentration in the aqueous solution subjected to decomposition as shown in the following table.

| $H_2O_2$ concentration (Wt %) | Heat of decomposition (cal/g) | Decomposition temperature (° C) |
| --- | --- | --- |
| 70 | 475 | 233 |
| 80 | 550 | 487 |
| 90 | 610 | 740 |
| 100 | 690 | 996 |

In a method and apparatus according to the invention, the heat of decomposition is utilized to heat air drawn into the intake system and/or fuel in the intake system, while oxygen evolved by the decomposition is utilized to reduce the concentrations of harmful substances in the exhaust gas.

From a practical viewpoint, an aqueous solution of hydrogen peroxide is more convenient to use than pure hydrogen peroxide. In the present invention hydrogen peroxide is used preferably in the state of aqueous solution the concentration of which is preferably 70% by weight at the lowest.

Figure 1:
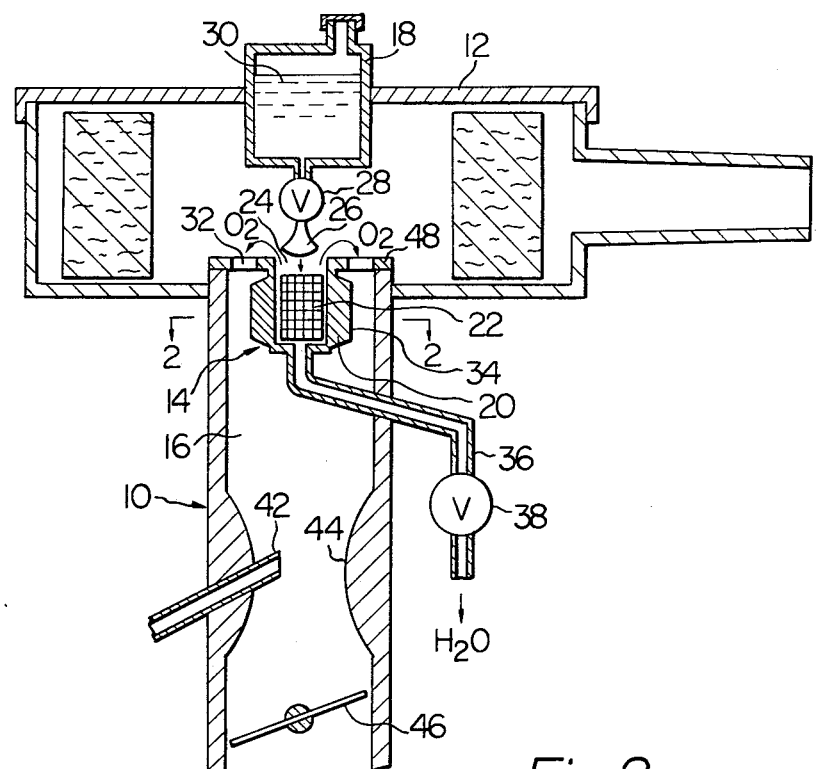
FIG. 1 is a sketch of a longitudinal section of an intake system of an internal combustion engine as an embodiment of the invention.
Figure 2:
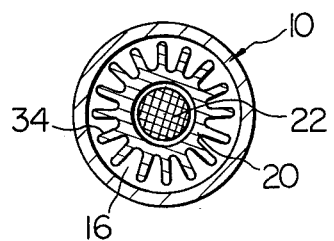
FIG. 2 is a cross-section taken along the line 2—2 of FIG. 1.

In a first preferred embodiment of the invention shown in FIGS. 1 and 2, an intake system of an internal combustion engine is constructed so as to utilize heat evolved by the catalytic decomposition of an aqueous solution of hydrogen peroxide for heating air drawn into the system before being mixed with fuel and to admix oxygen evolved by the decomposition with the drawn air. This system comprises a customary carburetor 10 equipped with an air cleaner 12. Apparatus for the catalytic decomposition of an aqueous solution of hydrogen peroxide indicated generally at 14 is assembled with the air cleaner 12 across the boundary between the air cleaner 12 and the induction passage 16 of the carburetor 10. The apparatus 14 includes a hydrogen peroxide tank 18 which is installed in the air cleaner 12, and a reaction vessel 20 which is arranged to extend into the induction passage 16. The reaction vessel 20 contains therein a conventional catalyst 22 for the decomposition of hydrogen peroxide, e.g., silver or a copper-chromium system and has an inlet port 24 which opens into the air cleaner 12. The hydrogen peroxide tank 18 is provided with a discharge nozzle 26 which is arranged to face the inlet port 24 of the reaction vessel 20 and a control valve 28 for controlling the feed rate of the aqueous hydrogen peroxide solution 30 from the tank 18 to the nozzle 26. The control valve 28 is operably combined with a control mechanism (not shown) which governs the opening of the valve 28 such that the feed rate of the hydrogen peroxide solution 30 through the valve 28 increases as the temperature of the drawn air and/or the temperature of the engine estimated from, e.g., the temperature of the cooling water decreases, but becomes very low, and even senses when the engine is stopped.

The reaction vessel 20 is fixed to a support member 48 which is fixed to the carburetor 10 so as to cover the upstream end of the induction passage 16 with air inlet holes 32 formed therethrough. As seen in FIG. 2, the outside wall surface of the reaction vessel 20 is shaped to have a multiplicity of fins 34 for heat radiation. A drain pipe 36 is connected to the reaction vessel 20 at its downstream end and extended outwardly of the induction passage 16 through the wall thereof. The extended end of the drain pipe 36 is normally closed by a valve 38 so that the water evolved in the reaction vessel 20 may be discharged therefrom and out of the intake system when the system is at rest. The carburetor 10 has a fuel discharge nozzle 42 at a venturi section 44 and a throttle valve 46 located downstream of the venturi 44 in a usual manner.

In operation, the control valve 28 is opened when the engine is started. Accordingly, the hydrogen peroxide solution 30 is fed to the reaction vessel 20 from the discharge nozzle 26 and undergoes the above described exothermic decomposition reaction upon contact with the catalyst 22 to give oxygen and water. The heat of decomposition is emitted from the reaction system to the ambient atmosphere or the induction passage 16 by radiation from the fins 34, so that the drawn air is heated efficiently while it flows along the reaction vessel 20. Oxygen evolved by the decomposition of the hydrogen peroxide solution 30 is discharged from the vessel 20 through the port 24 and drawn into the induction passage 16 together with the heated air.

Thus, the fuel is jetted from the nozzle 42 into a flow of a heated and oxygen-enriched air and, hence, vaporized thoroughly within the induction passage 16. Consequently, the resulting combustible mixture can be burned easily and smoothly in the combustion chambers of the engine even though the engine is started in the cold. As the engine temperature rises and the evaporation of fuel becomes easier, the degree of opening of the control valve 28 is regulated so as to reduce the feed rate of the hydrogen peroxide solution 30 to the reaction vessel 20. The control valve 28 may be closed ultimately if any heating of the drawn air is not intended when the engine is at normal operational temperatures.

Since combustion in the engine occurs at satisfactorily high efficiencies when the above described intake system is employed, there is no need of supplying a fuel-enriched combustible mixture to the combustion chambers and there occurs no increase in the fuel consumption. The heating of the drawn air according to the invention begins soon after the start of the engine operation unlike a conventional heating method for a similar purpose by the use of the exhaust gas as the heat source, so that warmup of the engine can be completed in quite a short time. Besides, the addition of oxygen derived from hydrogen peroxide to the combustible mixture prevents the combustion in the engine from remaining incomplete and producing increased amounts of carbon monoxide and/or unburned hydrocarbons.

Figure 3:
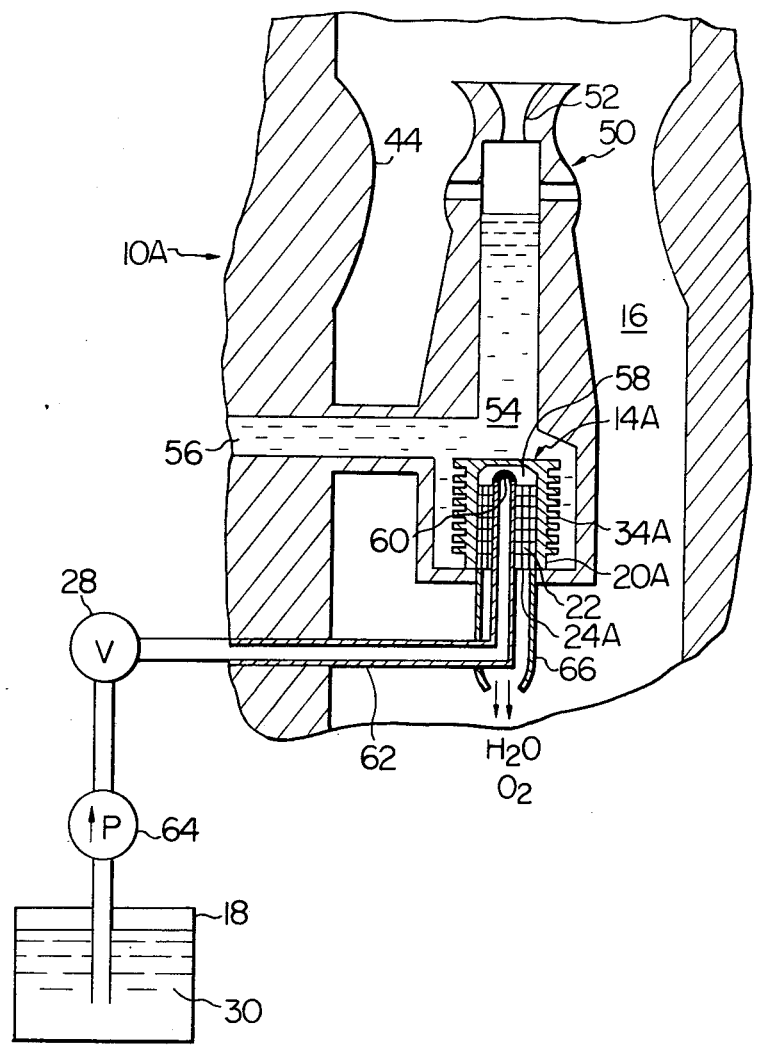
FIG. 3 is a fragmentary and longitudinal sectional view of a slightly different intake system as another embodiment of the invention.

As a second preferred embodiment of the invention, a carburetor 10A of FIG. 3 is provided with apparatus 14A for decomposing the hydrogen peroxide solution 30 in such an arrangement that fuel is heated by the heat of decomposition prior to jetting into the induction passage 16 from a fuel nozzle 50, which has a small venturi 52 at the end thereof. A reaction vessel 20A for containing therein the catalyst 22 is installed in the carburetor 10A in such an arrangement that the outer surface of the vessel 20A is immersed in fuel 54 which flows through a fuel passage 56 connecting the nozzle 50 to the float chamber (not shown). A single port 24A of the vessel 20A is isolated from the fuel 54 but exposed to the induction passage 16 at a section downstream of the venturi 44. The catalyst 22 is disposed in the vessel 20A such that a space 58 is formed between the inner end of a column of the catalyst 22 and the closed bottom of the vessel 20A. A tubular nozzle 60 is inserted into the vessel 20A through the column of the catalyst 22 so as to open into the space 58. The nozzle 60 is connected to the hydrogen peroxide tank 18 through a feed pipe 62 with the control valve 28 and a pump 64. A discharge pipe 66 is preferably connected to and extended outwardly from the port 24A such that a portion of the feed pipe 62 is enclosed in the discharge pipe 66. The vessel 20A has a multiplicity of radiator fins 34A generally similarly to the vessel 20 of FIGS. 1 and 2.

When the control valve 28 and the pump 64 cause the hydrogen peroxide solution 30 to jet from the nozzle 60 into the space 58 in the reaction vessel 20A, the jetted hydrogen peroxide solution 30 flows downwards through the catalyst 22 and is decomposed into oxygen and water with evolution of heat. Accordingly, the fuel 54 is heated before reaching the exit of the nozzle 50 and evaporates easily and thoroughly when jetted from the nozzle 50. The oxygen produced in the reaction in the reaction vessel 20A is discharged from the vessel 20A through the port 24A and mixed with the air-fuel mixture flowing in the induction passage 16. Thus, the system of FIG. 3 brings about the same results as the system of FIGS. 1 and 2. In the case of this system, water evolved by the decomposition of the hydrogen peroxide solution 30 is fed to the engine together with the oxygen-enriched combustible mixture. This water, however, has little adverse effect on the combustion of the mixture because of it being in a state of heated vapor.

In a third embodiment illustrated in FIGS. 4 and 5, apparatus 14B for the decomposition of the hydrogen peroxide solution 30 is constructed and arranged to heat an air-fuel mixture flowing in the induction passage 16 at a section downstream of the throttle valve 46. A tubular reaction vessel 20B, which is made up of outer and inner tubular wall members 68, 68', is installed in the carburetor 10 in such an arrangement that the central vacant section of the vessel 20B defines a portion of the induction passage 16 at a section downstream of the throttle valve 46. The catalyst 22 is disposed in a space defined between the two tubular wall members 68, 68' of the vessel 20B in a tubular configuration, and the hydrogen peroxide solution 30 is fed to the vessel 20B at an upstream side end thereof through a feed pipe 62A under the control of the control valve 28. The vessel 20B has a multiplicity of radiation fins 34B, which extend from the inner wall 68' of the vessel 20B radially into the induction passage 16, and a discharge port 70 formed in the inner wall 68' at its downstream side end.

The operation of this apparatus 14B will now be understood without any further explanation. Both oxygen and water produced by the decomposition reaction in the vessel 20B are discharged therefrom through the port 70 and fed to the engine together with the heated air-fuel mixture.

In the foregoing description, oxygen produced by the decomposition of the hydrogen peroxide solution 30 is supplied to the combustion chambers of the engine together with the air-fuel mixture. According to the invention, this oxygen may alternatively be fed to the exhaust line of the engine to cause after-burning of the exhaust gas with the intention of further reducing the concentrations of carbon monoxide and unburned hydrocarbons in the exhaust gas before emission into the atmosphere. Referring to FIG. 6, the mixture of oxygen and water is taken out of the decomposition apparatus 14 and introduced to a vapor-water separator 72 which is arranged outside of the apparatus for the decomposition of the hydrogen peroxide solution 30. Then, oxygen alone is supplied from the separator 72 through a feed pipe 76 to the exhaust pipe 74 or a thermal reactor (not shown) which is possibly included in the exhaust line. The feed pipe 76 is equipped with a check valve 78 for preventing the exhaust gas from flowing into the separator 72.

It is permissible to feed the evolved oxygen to both the combustion chamber and exhaust line of the engine simultaneously.

The foregoing detailed description of preferred embodiments was limited to an intake system comprising a carburetor for the preparation of an air-fuel mixture. It will be understood, however, that the present invention is applicable fundamentally similarly to other types of conventional intake systems comprising a fuel injection apparatus for the preparation of the air-fuel-mixture.

What is claimed is:

1. A method of accelerating evaporation of a liquid fuel in an intake system of an internal combustion engine said intake system having fuel introduced into a flow of air to prepare a combustible mixture, comprising the steps of:
    subjecting hydrogen peroxide to catalytic decomposition in a reaction vessel thereby to produce oxygen and water with evolution of heat; and
    transferring the heat of decomposition to at least one component of said combustible mixture within the intake system before said combustible mixture is admitted into the combustion chambers of the engine.

2. A method as claimed in claim 1, wherein said hydrogen peroxide is in the state of aqueous solution.

3. A method as claimed in claim 2, wherein the concentration of hydrogen peroxide in said aqueous solution is 70% by weight at the lowest.

4. A method as claimed in claim 1, wherein said heat is transferred to air drawn into the intake system prior to preparation of said combustible mixture.

5. A method as claimed in claim 1, wherein said heat is transferred to the fuel prior to preparation of said combustible mixture.

6. A method as claimed in claim 1, wherein said heat is transferred to said combustible mixture.

7. A method as claimed in claim 1, further comprising the step of admixing said oxygen with said combustible mixture.

8. A method as claimed in claim 1, further comprising the step of feeding said oxygen to the exhaust system of said engine.

9. In an internal combustion engine working on a combustible mixture of air and fuel, an intake system comprising:
    an induction passage for drawing air therein and conducting the drawn air to a combustion chamber of the engine;
    means for feeding an evaporable fuel to the drawn air flowing through said induction passage;
    means for catalytically decomposing hydrogen peroxide into oxygen and water with evolution of heat and transferring said heat to at least one component of said combustible mixture within said induction passage; and
    means for feeding hydrogen peroxide to the decomposition means in a controlled manner such that the feed rate of said hydrogen peroxide is increased when the temperature of the engine is relatively low.

10. An intake system as claimed in claim 9, wherein said hydrogen peroxide is in the form of an aqueous solution.

11. An intake system as claimed in claim 10, wherein the concentration of hydrogen peroxide is said aqueous solution is 70% by weight at the lowest.

12. An intake system as claimed in claim 9, further comprising means for admixing said oxygen with said combustible mixture.

13. In an internal combustion engine working on a combustible mixture of air and evaporable fuel, an intake system comprising:
    a carburetor having an induction passage, a fuel discharge nozzle arranged to open into said induction passage at a venturi;
    an air cleaner attached to said carburetor at the upstream end of said induction passage;
    a reaction vessel containing therein a catalyst capable of decomposing hydrogen peroxide into oxygen and water with evolution of heat, said reaction vessel being attached to said carburetor at a location close to said upstream end and arranged such that an inlet port of said reaction vessel opens into said air cleaner and that a major part of said reaction vessel extends into said induction passage at a section upstream of said venturi, the wall of said reaction vessel forming a multiplicity of fins extending outwardly for radiation of heat over said major part;

a tank containing therein an aqueous solution of hydrogen peroxide and having a discharge nozzle, said tank being attached to said air cleaner and arranged such that said discharge nozzle faces said inlet port of said reaction vessel; and means for controlling the discharge rate of said solution from said discharge nozzle according to the temperature of the engine.

14. An intake system as claimed in claim 13, further comprising a drain pipe extending outwardly of said carburetor from the downstream end of said reaction vessel with a valve located outside of said carburetor for governing fluid flow from said reaction vessel to the atmosphere through said drain pipe.

15. In an internal combustion engine working on a combustible mixture of air and evaporable fuel, an intake system comprising:

a carburetor having an induction passage, a fuel discharge nozzle arranged to open into said induction passage at a venturi, a reaction vessel containing therein a catalyst capable of decomposing hydrogen peroxide into oxygen and water with evolution of heat, said reaction vessel being assembled with said carburetor and arranged such that a major part of said reaction vessel is immersed in the fuel entering said discharge nozzle and that said catalyst is isolated from said fuel but exposed to said induction passage at a section downstream of said venturi through a port of said reaction vessel, the wall of said reaction vessel forming a multiplicity of fins extending outwardly for radiation of heat over said major part;

a tank containing therein an aqueous solution of hydrogen peroxide and being assembled with said carburetor;

a conduit providing fluid communication between said tank and said catalyst; and means for controlling the feed rate of said solution through said conduit according to the temperature of the engine.

16. An intake system as claimed in claim 15, wherein said reaction vessel forms therein a space at an end section opposite said port, said catalyst being disposed in said reaction vessel to fill the remaining section defined between said space and said port, said conduit being arranged to pass through said catalyst and open at an end thereof into said space.

17. In an internal combustion engine working on a combustible mixture of air and evaporable fuel, an intake system comprising:

a carburetor having an induction passage, a fuel discharge port opening into said induction passage at a venturi, and a throttle valve located downstream of said venturi;

a tubular reaction vessel defined by outer and inner tubular wall members with a vacant center, containing between said outer and inner wall members a catalyst capable of decomposing hydrogen peroxide into oxygen and water with evolution of heat, said reaction vessel being assembled with said carburetor such that a major part of said tubular inner wall member defines a part of said induction passage at a section downstream of said throttle valve, said tubular inner wall member having a multiplicity of fins extending inwardly for radiation of heat over said major part and a discharge port opening into said induction passage;

a tank containing therein an aqueous solution of hydrogen peroxide and being assembled with said carburetor;

a conduit providing fluid communication between said tank and said catalyst; and means for controlling the feed rate of said solution through said conduit according to the temperature of the engine.

18. An internal combustion engine working on a combustible mixture of air and evaporable fuel, comprising:

means for preparing said combustible mixture and conducting the prepared combustible mixture to a combustion chamber of the engine;

means for catalytically decomposing hydrogen peroxide into oxygen and water with evolution of heat and transferring the evolved heat to at least one component of said combustible mixture within the former means;

means for feeding hydrogen peroxide to the decomposition means in a controlled manner such that the feed rate of said hydrogen peroxide is increased when the temperature of the engine is relatively low;

an exhaust line; and means for receiving said oxygen and water from said decomposition means, isolating said oxygen from said water and feeding the isolated oxygen to said exhaust line.

19. A method of accelerating evaporation of a liquid fuel in a carburetor of an internal combustion engine system, comprising the steps of:

subjecting the hydrogen peroxide to catalytic decomposition in a reaction vessel thereby to produce oxygen and water with the evelution of heat;

transferring the heat of decomposition to one component of a combustible air-fuel mixture to be prepared in the carburetor before said one component contacts the other component of the combustible mixture; and thereafter mixing said one component with the other component within the carburetor.

20. A method as claimed in claim 19, wherein said heat is transferred to the fuel prior to preparation of said combustible mixture.

21. A method as claimed in claim 20, further comprising the steps of admixing said oxygen with said air-fuel mixture before said air-fuel mixture is admitted into the combustion chambers of the engine.

22. A method as claimed in claim 20, further comprising the steps of feeding said oxygen to the exhaust system of said engine.

23. A method as claimed in claim 19, wherein hydrogen peroxide is in an aqueous solution and a concentration of at least 70%.

* * * * *